Patented Jan. 8, 1952

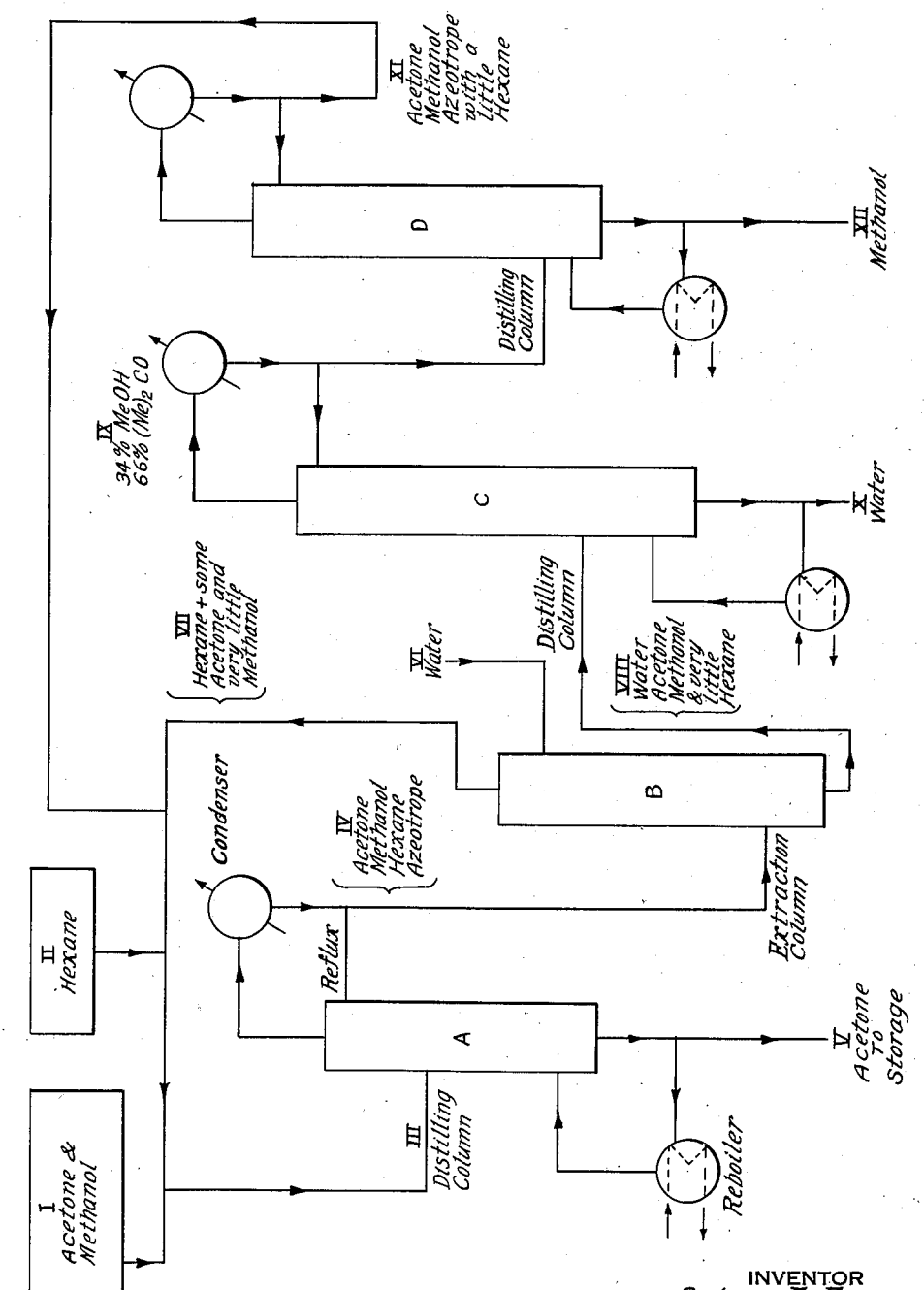

UNITED STATES PATENT OFFICE 2,581,789

AZEOTROPIC DISTILLATION OF METHANOL AND ACETONE WITH HEXANE

Sylvan E. Forman, Baltimore, Md., assignor, by mesne assignments, to National Distillers Products Corporation, New York, N. Y., a corporation of Virginia Application April 11, 1949, Serial No. 86,641

5 Claims. (Cl. 202—42)

This invention relates to a method for the separation of acetone and methanol when in admixture with each other.

In the course of certain industrial processes, mixtures of acetone and methanol result. Thus, in the oxygenation of aliphatic hydrocarbons, in the reaction of carbon monoxide with hydrogen in the presence of a catalyst, and in the destructive distillation of wood, mixtures of acetone and methanol result together with other materials.

It is well known that acetone and methanol distill at atmospheric pressure at 55.7° C. in constant proportions of 12% methanol and 88% acetone. It is extremely difficult or impossible to separate this mixture by ordinary rectification at atmospheric pressure. If mixtures containing more than 12% methanol are subjected to rectification, the constant boiling mixture is first obtained and the residual excess of methanol over the 12% is left as a residue which distills at 64.7° C. If a mixture contains less than 12% methanol, it is extremely difficult to remove the constant boiling mixture by rectification at atmospheric pressure and to leave pure acetone as a residue, because acetone distills at 56.4° C., only 0.7° C. higher than the constant boiling mixture.

It is also well known in the art that acetone and hexane form a constant boiling mixture at atmospheric pressure consisting of 59% acetone and 41% hexane which distills at 49.8° C. Further, it is known that methanol and hexane form a constant boiling mixture at atmospheric pressure consisting of 27% methanol and 73% hexane which distills at 49.5° C. Pure n-hexane is known to distill at 69° C. at atmospheric pressure.

I have discovered that acetone, methanol and hexane form a constant boiling ternary mixture at atmospheric pressure. This mixture distills at 47° C. and consists of 30.8% acetone, 14.6% methanol and 54.6% hexane. This discovery can be used to separate methanol from acetone and is illustrated in detail in the following examples. The flow sheet will aid in this description of the process.

1,000 grams of a mixture I containing 10% methanol and 90% acetone by weight was mixed with a weight of hexane II equal to four times the weight of methanol. This resulting mixture III was fed into a precision rectifying column A. The distillate IV from the top of column A amounted to 740 grams and consisted of 13.5% methanol, 32.5% acetone and 54.0% hexane. The effluent V from the bottom of column A amounted to 660 grams and was pure acetone containing less than 0.05% methanol by the U. S. P. XIII chromotropic acid test for methanol in ethyl alcohol. The distillate IV was agitated with one quarter of its volume (254 grams) of water VI in extraction column B and the resulting layers were separated. The oil layer VII amounted to 449 grams and contained 0.4% methanol, 10.5% acetone, 89.0% hexane and 0.1% water. After making due allowance for the constituents other than hexane, this oil layer was used over again to separate acetone and methanol mixture as described below. The water layer VIII amounted to 545 grams and contained 18.0% methanol, 35.5% acetone, 46.5% water and only a trace of hexane.

The water layer VIII was rectified in column C to produce 291 grams of distillate IX containing 33.7% methanol, 66.3% acetone and a trace of hexane and 254 grams of effluent X which consisted of water. Distillate IX was then rectified in column D to produce 219 grams of distillate XI which was the acetone-methanol azeotrope XI (12.0% methanol and 88.0% acetone) containing a trace of hexane and 72 grams of effluent XII which consisted of methanol.

To illustrate the reuse of the hexane, oil layer VII was mixed with 950 grams of a 90% acetone and 10% methanol mixture Ia to give composition IIIa. Compositions IIIa through XIIa were processed in the same way that III through XII were treated, but the resulting mixtures and products had somewhat different percentage compositions because the starting materials had different compositions. Data concerning compositions IIIa through XIIa are given in the tables below:

| IIIa | IVa |
|---|---|
| Amount, 1,399 grams | Amount, 720 grams |
| MeOH, 6.9% | MeOH, 13.4% |
| Me₂CO, 64.5% | Me₂CO, 31.6% |
| Hexane, 28.6% | Hexane, 55.0% |
| H₂O, trace | |

| Va | VIa |
|---|---|
| Amount, 675 grams | Amount, 250 grams |
| Me₂CO, 100% | Water, 100% |
| MeOH, <0.05% | |
| Hexane, <0.05% | |

| VIIa | VIIIa |
|---|---|
| Amount, 445 grams | Amount, 522 grams |
| MeOH, 0.4% | MeOH, 18.2% |
| Me₂CO, 10.5% | Me₂CO, 34.3% |
| Hexane, 89.0% | H₂O, 47.5% |
| H₂O, trace | Hexane, trace |

| IXa | Xa |
|---|---|
| Amount, 274 grams | Amount, 248 grams |
| MeOH, 34.7% | Water, 100% |
| Me₂CO, 65.3% | |
| Hexane, trace | |

| XIa | XIIa |
|---|---|
| Amount, 203 grams | Amount, 71 grams |
| MeOH, 12.0% | MeOH, 100% |
| Me₂CO, 88.0% | |

Various modifications may be made in the specific procedure described to produce other embodiments falling within the scope of the present invention.

It is not necessary that the percentage of methanol and acetone be 10% and 90%. The separation can be accomplished when only a mere trace of methanol is present and with increasing quantities of methanol up to mixtures of 30% methanol and 70% acetone. However, with mixtures higher than about 20% methanol it would be much more advantageous to first separate the mixture by rectification into a mixture consisting of essentially the azeotrope composition between acetone and methanol and pure methanol. The azeotrope can then be separated by the described method.

Also if a small amount (e. g., 10% or less) of acetone is present in methanol, the former can be removed by the addition of hexane and rectification with greater ease than the acetone-methanol azeotrope can be separated from methanol. With the hexane system, the boiling point spread between it and methanol is 17.5° C. while the spread between acetone-methanol azeotrope and methanol is only 9° C. However, when the concentration of acetone in the methanol is greater than about 10%, a preliminary separation of the acetone-methanol azeotrope from the methanol should be made before removing the last small percentages of acetone from methanol.

When removing methanol from acetone with hexane it is necessary to use at least 3.7 parts by weight of hexane to every part of methanol. If a smaller quantity of hexane is used, the methanol will not be completely removed. If a larger quantity of hexane is used, all of the methanol will be removed but some additional acetone will be distilled with it. Four parts by weight of hexane per weight of methanol is the preferred ratio because it insures the complete removal of methanol without carrying along excessive additional quantities of acetone. As a general rule when the methanol is present in 20% concentration or less, in order to achieve any separation, the weight of hexane minus 3.7 times the weight of methanol must be less than 0.7 times the difference between the weight of acetone minus twice the weight of methanol.

When small percentages (e. g., 10% or less) of acetone are to be removed from methanol, it is necessary to use at least 1.77 parts of hexane by weight per part of acetone. If a smaller quantity of hexane is used, the acetone will not be completely removed. If a larger quantity of hexane is used all of the acetone will be removed but some additional methanol will distill with it. Two parts of hexane per part of acetone is the preferred ratio for removing acetone because it ensures the complete removal of acetone without carrying along excessive additional quantities of methanol. As a general rule when the acetone is present in 10% or less concentration, in order to achieve any separation, the weight of hexane minus 1.77 times the weight of acetone must be less than 2.7 times the difference between the weight of methanol and one half the weight of acetone.

Let $H$ = weight of hexane
Let $A$ = weight of acetone
Let $M$ = weight of methanol When $M \leqq A/4$ or less. Then $$H - 3.7M < 0.7(A - 2M)$$

or, $$H - 2.3M < 0.7A$$

to achieve any separation, and $H - 4M$ is the preferred ratio.

When
$A \leqq M/9$ or less. Then $$H - 1.77A < 2.7(M - 0.5A)$$

or $$H - 0.42A < 2.7M$$

to achieve any separation, and $H = 2A$ is the preferred ratio.

It is not necessary to use pure n-hexane to effect the separation. A commercial grade hexane with specific gravity $$\frac{20}{20} \; 0.684$$

$N_D^{20}$ 1.3836, and a distillation range of 67–70° C. consisting of a petroleum fraction is satisfactory.

It is not necessary that the acetone and methanol mixture be free of other materials, although this is usually desirable. Thus, if the mixture contains propionaldehyde, the latter distills with the hexane azeotrope and leaves the residue almost free from this contaminant. A difficult separation is thereby accomplished more easily. If the mixture contains methyl acetate, the latter stays mostly with the acetone, although part of it goes with the hexane. In this case, there is no practical separation of the methyl acetate, although the methanol and acetone separation is accomplished.

Water has an adverse effect on the separation. A mixture of 41% acetone, 41% hexane, 13% methanol and 5% water rectified in a precision still gave a distillate composed of 29.3% acetone, 56.4% hexane, 13.8% methanol and 0.5% water.

A mixture containing 0.5% water, 7% methanol, 28% hexane and 64.5% acetone can be separated into pure acetone and azeotrope, but when higher percentages of water are present, a larger quantity of hexane per unit quantity of methanol is required. Thus 6.6% methanol, 33.0% hexane, 59.4% acetone and 1.05% water can be successfully separated into pure acetone and distillate; but if the water in this mixture is increased to 1.4%, separation cannot be achieved under these conditions. A mixture of 1.3% water, 6.36% methanol, 35.0% hexane and 57.3% acetone was separated into pure acetone and distillate. In all of these experiments, the same distillation column, feed point, reflux ratio, etc. were used. The experiments indicate that the adverse effect of water can be overcome by the use of additional amounts of hexane.

I claim:

1. The method of separating acetone from methanol, where the two are present in admixture, comprising mixing the said admixture with hexane, distilling the resultant mixture with refluxing at a head temperature of 47° C. and separating out an overhead fraction composed of methanol, acetone and hexane and a residual fraction composed of a substantially pure constituent of the initial admixture.

2. The process of claim 1 in which the initial admixture of methanol and acetone contains not more than 20% by weight of methanol, based on the total weight of acetone and methanol, and in which the hexane is added in an amount at least 3.7 times the weight of the methanol but such that the weight of the hexane minus 3.7 times the weight of the methanol is less than 0.7 times the difference between the weight of the acetone and twice the weight of the methanol.

3. The process of claim 2 in which four parts by weight of hexane is added per part of methanol present.

4. The process of claim 1 in which the initial admixture of methanol and acetone contains not more than 10% by weight of acetone, based on the total weight of acetone and methanol, and in which the hexane is added in an amount at least 1.77 times the weight of acetone, but such that the weight of the hexane minus 1.77 times the weight of the acetone is less than 2.7 times the difference between the weight of the methanol and one-half the weight of the acetone.

5. The process of claim 4 in which two parts by weight of hexane is added per part of acetone present.

SYLVAN E. FORMAN.

REFERENCES CITED

The following references are of record in the file of this patent:

UNITED STATES PATENTS

| Number | Name | Date |
|---|---|---|
| 1,847,597 | Charles | Mar. 1, 1932 |
| 2,351,527 | Lembcke | June 13, 1944 |
| 2,528,761 | Lake et al. | Nov. 7, 1950 |

FOREIGN PATENTS

| Number | Country | Date |
|---|---|---|
| 286,425 | Germany | Aug. 10, 1915 |

OTHER REFERENCES

Horsley, "Table of Azeotropes and Non-Azeotropes," Analytical Chemistry, vol. 19 (August 1947) pages 589 and 600.